United States Patent
Yamazaki et al.

(10) Patent No.: US 6,401,698 B1
(45) Date of Patent: Jun. 11, 2002

(54) VEHICLE FUEL GAS SUPPLY SYSTEM

(75) Inventors: Hideharu Yamazaki; Shusuke Akazaki; Akifumi Otaka; Hiroyuki Goto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,747

(22) Filed: Mar. 16, 2000

(30) Foreign Application Priority Data

Mar. 19, 1999 (JP) .......................................... 11-076257

(51) Int. Cl.[7] .............................................. F02M 21/02
(52) U.S. Cl. ...................................................... 123/529
(58) Field of Search ............................ 123/529, 198 D, 123/198 DB, 527, 525, 520

(56) References Cited

U.S. PATENT DOCUMENTS 5,611,316 A * 3/1997 Oshima et al. ............. 123/529
5,632,250 A * 5/1997 Kato et al. .................. 123/490
6,044,806 A * 4/2000 Brown et al. ............... 123/529

FOREIGN PATENT DOCUMENTS

JP          688765 A  * 3/1994 ................. 73/40
JP      7-189731       7/1995

* cited by examiner

*Primary Examiner*—Marguerite McMahon
*Assistant Examiner*—Hyder Ali
(74) *Attorney, Agent, or Firm*—Arent Fox Kintner Plotkin & Kahn, PLLC

(57) ABSTRACT

A vehicle fuel gas supply system includes, a fuel line supplying a fuel gas to a gas engine, a shut-off valve and a pressure sensor disposed on said fuel line, and a control section. The pressure sensor is disposed closer to the gas engine in comparison with the shut-off valve. The control section closes the shut-off valve based on a failure diagnostic signal, calculates a pressure drop rate based on pressure information taken in from the pressure sensor after the closure of the shut-off valve and an elapsed time, and judges that the shut-off valve is in a failure state when the pressure drop rate so calculated is smaller than a predetermined pressure drop rate threshold value.

7 Claims, 12 Drawing Sheets

FIG. 12 (a)
FAILURE DIAGNOSTIC SIGNAL
FIG. 12 (b)
DIAGNOSTIC TIMER
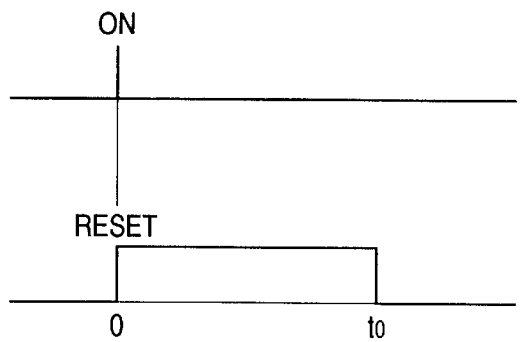
FIG. 12 (c)
SECOND SHUT-OFF VALVE
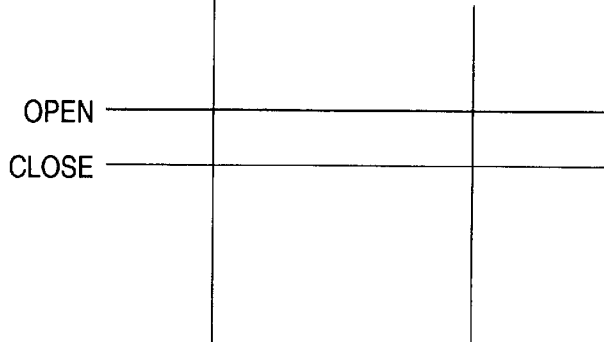
FIG. 12 (d)
FIRST SHUT-OFF VALVE
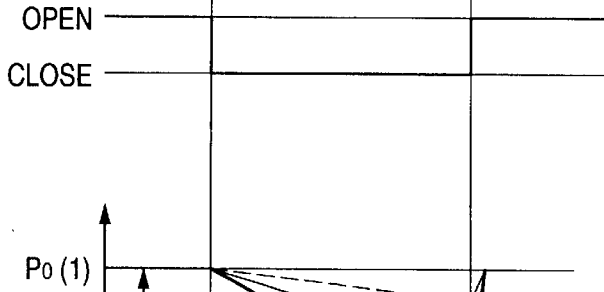
FIG. 12 (e)
PRESSURE Po (FIRST PRESSURE SENSOR OUTPUT)
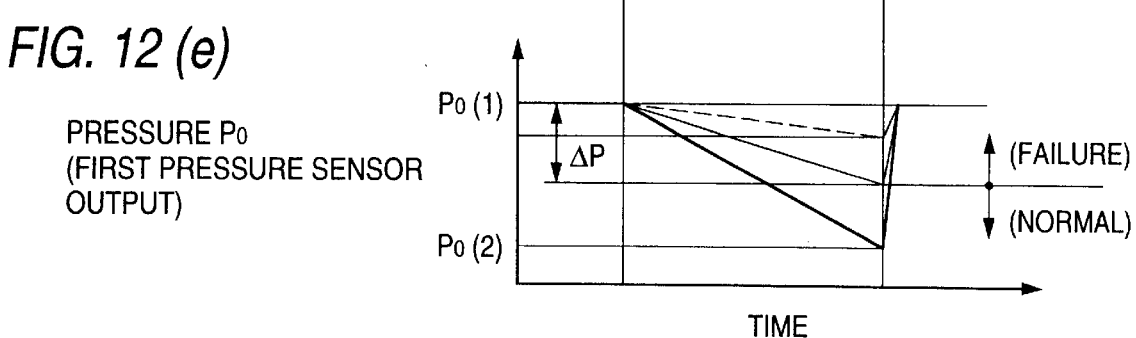

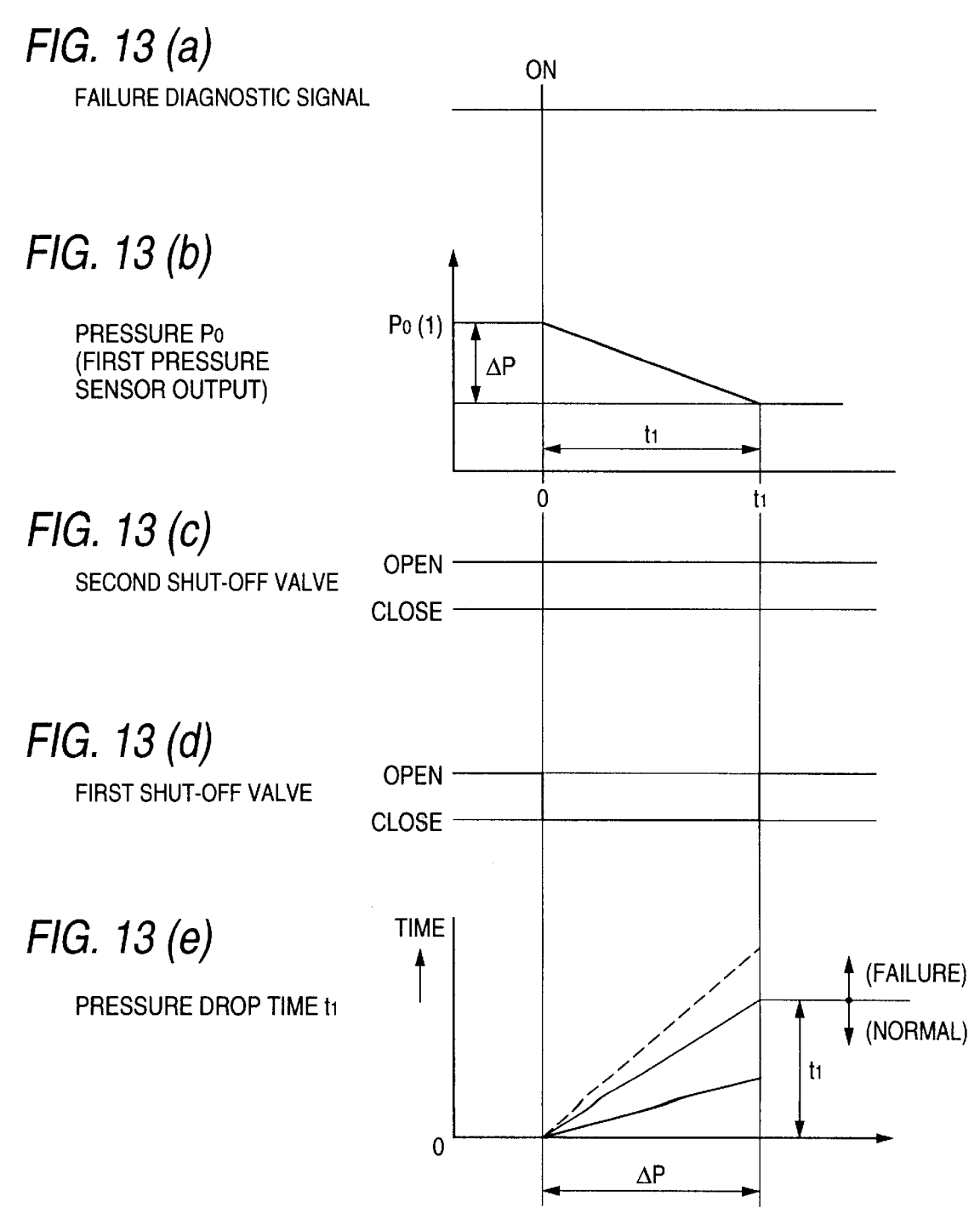

FIG. 13 (a)
FAILURE DIAGNOSTIC SIGNAL

FIG. 13 (b)
PRESSURE $P_0$
(FIRST PRESSURE SENSOR OUTPUT)

FIG. 13 (c)
SECOND SHUT-OFF VALVE

FIG. 13 (d)
FIRST SHUT-OFF VALVE

FIG. 13 (e)
PRESSURE DROP TIME $t_1$

VEHICLE FUEL GAS SUPPLY SYSTEM

BACKGROUND OF THE INVENTION

1. Field of the Invention

The present invention relates to a technology for judging that a shut-off valve used in a vehicle fuel gas supply system is in a failure state.

2. Description of the Related Art

In recent years, natural gas (NG) has been used as one of alternative fuels to gasoline and gas oil, and in a case where natural gas is used as fuel for vehicles, in particular, passenger vehicles, a compressed-gas cylinder (bomb) is mounted on a passenger vehicle. A natural gas compressed to in the order of 200 kg/cm$^2$ is then filled in the compressed-gas cylinder, and the natural gas so filled is then reduced in pressure by means of a pressure reducing valve to become a low pressure gas for supply to a combustion chamber. A natural gas as compressed to a high pressure like this is called a compressed natural gas (CNG).

Research on vehicles using compressed natural gas as a fuel has been progressing, and Japanese Patent Unexamined Publication No. Hei.7-189731 entitled "Residual Fuel Volume Display Device for Gas-Fueled Vehicles" proposes a technology for displaying the volume of residual fuel more accurately by correcting pressure and temperature fluctuations attributed to a compressible fluid. This publication discloses a CNG tank, a high pressure piping for supplying a compressed natural gas taken from the CNG tank, a first solenoid shut-off valve provided upstream of the high pressure piping, and a second solenoid shut-off valve provided downstream of the high pressure piping. The first and second solenoid shut-off valves are able to be closed by means of an ECU.

In general, used as the solenoid shut-off valves is a shut-off valve in which the valve is opened when a plunger (rod) is axially moved by virtue of the electromagnetic force of the solenoid, while the valve is closed when the plunger is returned by virtue of the compression force of a spring used. In order to allow the plunger to reciprocate in the axial directions, there must be provided a gap. However, if this gap is too large, the plunger may be moved in radial directions, causing "chattering." To cope with this, the gap between the plunger and a component for supporting the plunger thereon needs to be as small as possible.

Natural gas consists mainly of methane gas, and since it is collected from the underground, the natural gas tends to contain water. Even if much labor is spent in producing a dried compressed natural gas, there exists a risk of water contained in air entering into a fuel tank mounted on a vehicle when the dried compressed natural gas is transferred into the fuel tank. In addition, it is well considered that water cannot be removed in a complete fashion even in producing a fuel line system.

There is a risk of the water so present generating rust at metallic portions of the solenoid valves. To cope with this, plungers are made of stainless steel or plated, but those countermeasures are not perfect.

There are considered the following two cases of failure in operation of the first solenoid shut-off valve.

The first case is where rust disturbs to open the shut-off valve cannot be opened because of rust. With the shut-off valve being left closed, a sufficient amount of fuel cannot be supplied to the engine, and therefore, although the engine can be started with fuel remaining within the fuel line, the engine stops soon thereafter.

The second case is where the shut-off valve from cannot be closed because of rust. With the shut-off valve being left opened, even if the engine is stopped, the compressed natural gas is kept supplied from the compressed gas cylinder to the high pressure piping, and therefore, there is a high risk of gas leakage while the engine is being stopped. In addition, in view of safety servicing of a vehicle, such a gas leakage is undesirable.

SUMMARY OF THE INVENTION

Then, an object of the present invention is to provide a technology for efficiently judging of a failure state of a solenoid shut-off valve used in a vehicle fuel gas supply system having a high probability of a risk of water entering into the fuel supply system.

With a view to attaining the aforesaid object, according to the present invention, there is provided a vehicle fuel gas supply system in which a shut-off valve and a pressure sensor are disposed in that order along a fuel line for supplying a fuel gas to a gas engine, comprising a control section for closing the shut-off valve based on a diagnostic signal, calculating a pressure drop rate based on pressure information taken in from the pressure sensor after the closure of the shut-off valve and an elapsed time, and judging that the shut-off value is in a failure state when the pressure drop rate so calculated is smaller than a predetermined pressure drop rate threshold value.

With this fuel gas supply system constructed as described above, it is possible to judge of a failure state of the shut-off valve while the vehicle is being stopped or running.

The diagnosis of failure consists of the following two types; the shut-off valve is kept opened and cannot be closed, and the shut-off valve is locked to the opened side and a sufficient degree of closure cannot be attained.

According to the present invention, it is possible not only to diagnose that the shut-off valve properly operates at suitable times but also to prevent a trouble that would be entailed by the failure of the shut-off valve.

BRIEF DESCRIPTION OF THE DRAWINGS

FIG. 12 is a time chart showing a failure diagnosis of the shut-off valve according to the present invention; and FIG. 13 is a time chart showing a failure diagnosis of the shut-off valve according to another embodiment of the present invention.

DETAILED DESCRIPTION OF THE PREFERRED EMBODIMENTS

Referring to the accompanying drawings, a mode of carrying out the present invention will be described below. In the following description, a first, a second, . . . or a primary, a secondary, . . . are a nominal identification prefix that is given in the order fuel gas flows in a fuel gas supply system.

Figure 1:
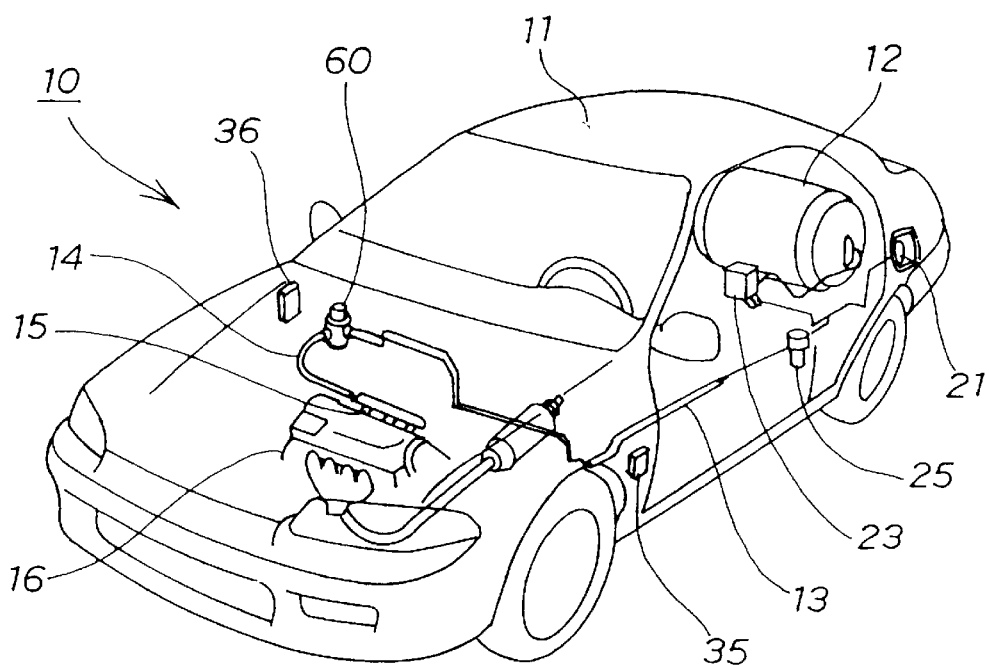
FIG. 1 is a diagram showing a vehicle to which the present invention is applied.

FIG. 1 is a diagram showing a vehicle to which the present invention is applied. The vehicle 10 is shown as being provided with a fuel gas supply system in which a CNG tank 12 filled with a compressed natural gas as a fuel gas is mounted at a rear part of a vehicle body 11 of this vehicle 10, the compressed natural gas within the CNG tank is supplied to a combustion chamber of a gas engine 16 mounted at a front portion of the vehicle body 11 via high pressure piping 13, a pressure control unit 60, low pressure piping 14, and an injector 15. The other reference numerals will be described later on.

Figure 2:
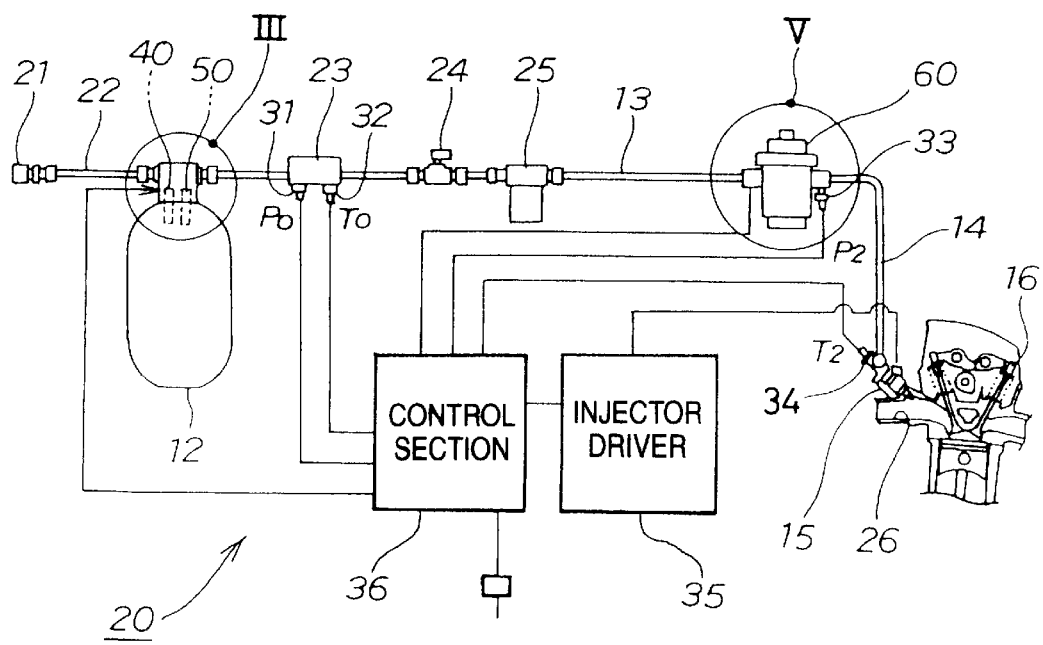
FIG. 2 is a drawing showing the principle of a fuel gas supply system according to the present invention.

FIG. 2 is a diagram explaining the principle of the fuel gas supply system according to the present invention. In this fuel gas supply system 20, a compressed natural gas can be filled in the CNG tank 12 from the outside via a filler port 21, a filler pipe 22 and a check valve 40, while the compressed natural gas so filled and stored in the CNG tank 12 can be sent to an intake port 26 via a first shut-off valve 50, the high pressure piping 13, a joint box 23, a manual On/Off valve 24, a filter 25, the pressure control unit 60, the low pressure piping 14 and the injector 15, which are disposed along the high pressure piping 13.

In addition, this system comprises a first pressure sensor 31 and a first temperature sensor 23 which are provided in the joint box 23, a second pressure sensor 33 provided at an outlet of the pressure control unit 60, a second temperature sensor 34 provided at the injector 15, an injector driver 35 for controlling the injector 15 and a control section 36 for controlling the first shut-off valve 50 and a second shut-off valve (which will be described in detail later on) installed in the pressure control unit 60 so as to be opened or closed.

Namely, the pressure $P_0$ and temperature $T_0$ of the compressed natural gas in the high pressure piping 13 are measured by means of the first pressure sensor 31 and the first temperature sensor 32, and information resulting from such measurements is inputted into the control section 36. The pressure $P_2$ and temperature, $T_2$ of the compressed natural gas in the low pressure piping 14! are measured by means of the second pressure sensor 33 and the second temperature sensor 34, and information resulting from such measurements is inputted into the control section 36. Then, the control section 36 controls the first shut-off valve 50 and the second shut-off valve installed in the pressure control unit 60 based on the inputted information to thereby judge whether or not those shut-off valves are in a failure state.

The compressed natural gas is a gas and a compressible fluid, and therefore, it follows the Boyle-Charles Law (PV/T=constant, where P is an absolute pressure, V is a volume or a capacity, and T is an absolute temperature). Here, the capacity of the flow path is constant, and therefore, V remains the same. With fluctuations in temperature, the pressure fluctuates in proportion thereto, and thus, there is a possibility that the pressure changes at all times, this causing a problem in control. To cope with this, the pressure $P_0$ is temperature corrected at the temperature $T_0$. Similarly, the pressure $P_2$ is temperature corrected at the temperature $T_2$. With such temperature corrections, any pressures can be regarded as a pressure referencing zero (0) degree, thereby making it possible for them to relatively be compared with each other.

Figure 3:
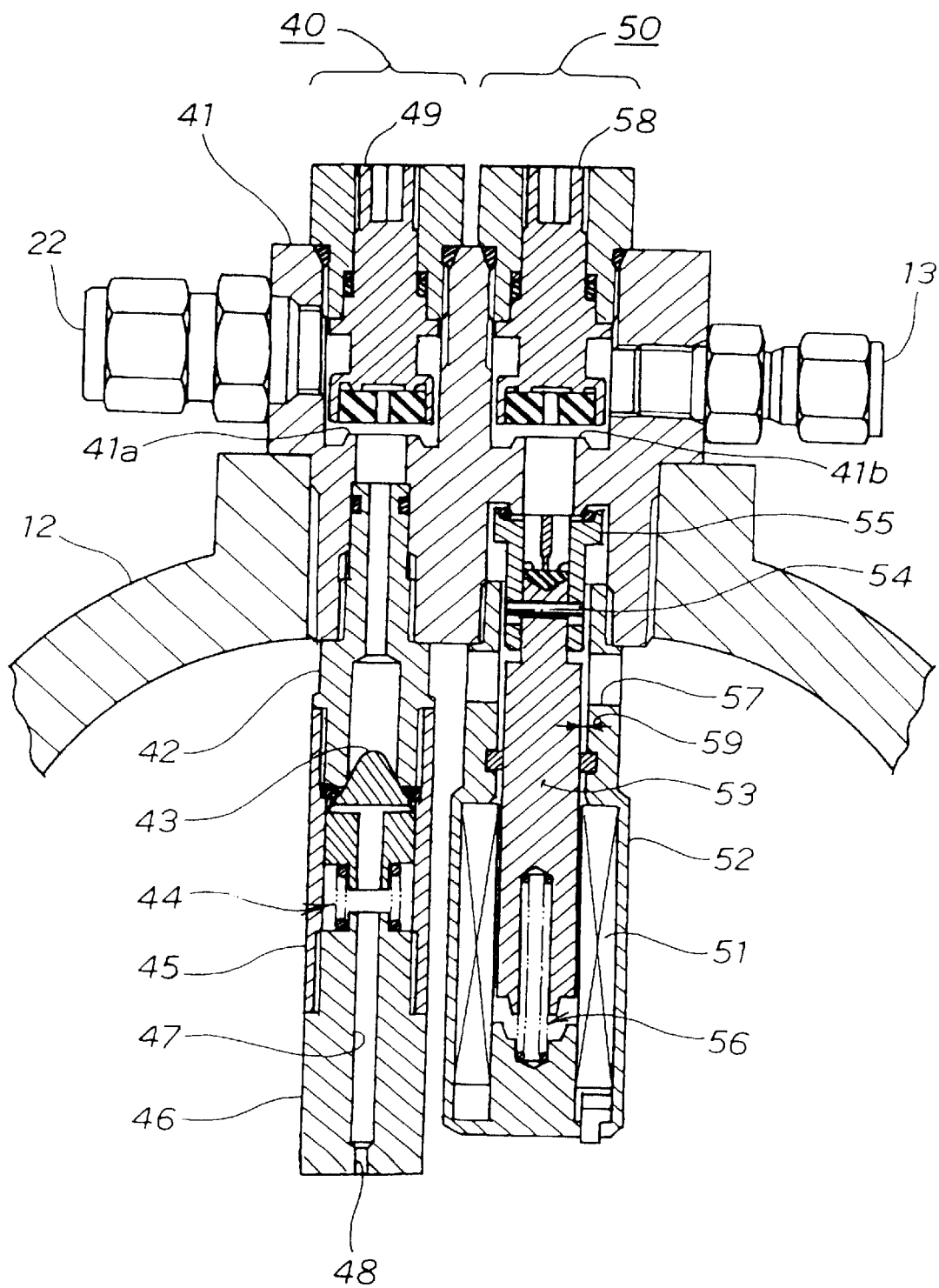
FIG. 3 is an enlarged view of a part indicated by a reference numeral III in FIG. 2.

FIG. 3 is an enlarged sectional view of a portion indicated by a circle denoted by reference numeral III in FIG. 2. The check valve 40 and the first shut-off valve 50 are incorporated in a common valve cage 41, and this valve cage 41 is screwed into an opening in the CNG tank 12. In particular, the first shut-off valve 50 is called an in-tank shut-off valve because a main part thereof resides inside the CNG tank 12. The construction of the check valve 40 and the first shut-off valve 50 will be described sequentially.

The check valve 40 is constructed such that a sleeve 42 is screwed into the valve cage 41, that a valve element 43 is brought into abutment with a lower opening of the sleeve 42, that the valve element 43 is pushed to a valve closing side by means of a spring 44, that this spring 44 is supported by another sleeve 45 and a rod 46, and that a flow path 47 and a throttle portion 48 are formed in the rod 46. An operation of the check valve 40 will be described referring to FIG. 4A. Reference numeral 49 denotes a stop plug, which is shown as being put in an open state. The plug 49 can be turned with a hexagon wrench so as to close an upper opening 41a. This is used in periodically inspecting the filler pipe 22 for maintenance.

The first shut-off valve 50 is a solenoid controlled shut-off valve which is constructed such that a cylindrical solenoid holder 52 for supporting a solenoid 51 is screwed into the valve cage 41, that a rod 53 is put through the solenoid holder 52, that a valve element 55 is fixed to a tip of the rod 53 via a pin 54, and that the valve element 55 is caused to confront a valve seat of the valve cage 41. When the solenoid 51 is excited, the rod 53 is withdrawn so as to open the shut-off valve by virtue of the attracting action of the solenoid 51 resulting, while, when the excitation of the solenoid 51 is stopped, the shut-off valve is closed by virtue of the pushing action of a spring 56 activated when the attracting action of the solenoid 51 disappears. Reference numeral 57 denotes a port opened in the solenoid holder 52.

An operation of the first shut-off valve 50 will be described referring to FIG. 4B. Reference numeral 58 also denotes a stop plug, which is shown as being in an open state. This plug can also be turned with the hexagon wrench to close an upper opening 41b.

Figures 4A, 4B:
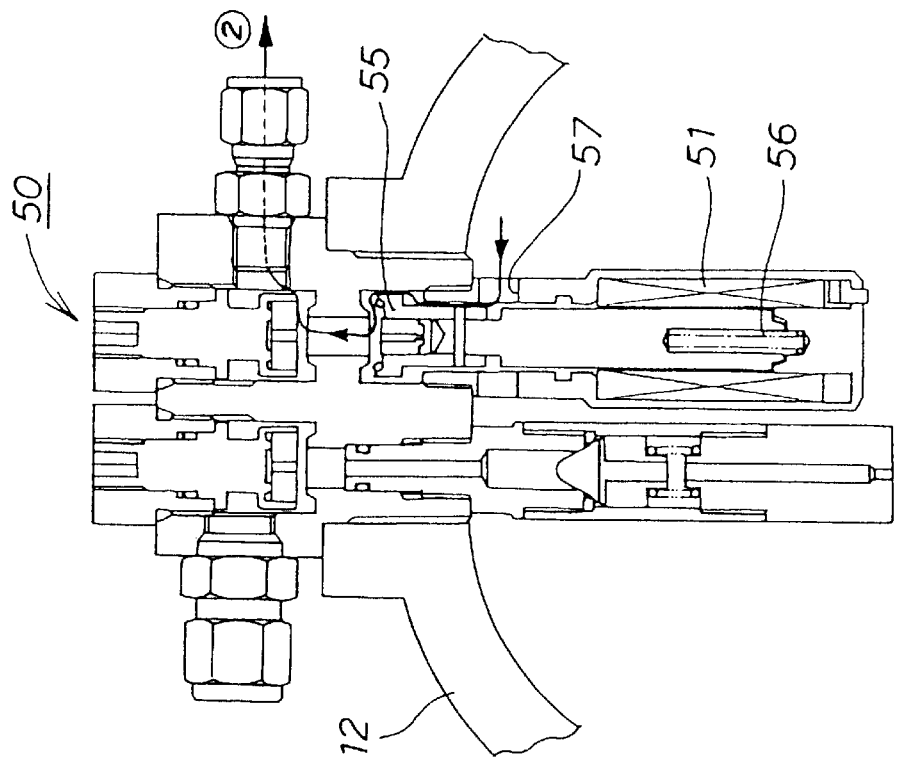
FIGS. 4A and 4B are drawings showing operations of a check valve and a first shut-off valve according to the present invention.

FIGS. 4A and 4B show operations of the check valve and the first shut-off valve according to the present invention.

In FIG. 4A, when compressed natural gas under high pressure is supplied as shown by a while arrow, the valve element 43 is moved to a valve opening side by virtue of the pressure of the gas. As a result of this, the compressed natural gas reaches the CNG tank 12 as indicated by an arrow ① via the throttle portion 48. When the supply of the compressed natural gas is stopped, the valve element 43 is returned by virtue of the action of the spring 45, whereby a reverse flow is prevented.

In FIG. 4B, when the solenoid 51 is excited, the valve element 55 is withdrawn to thereby produce a valve opened state, whereby the compressed natural gas stored in the CNG tank 12 flows as indicated by an arrow ② through the port 57. When the excitation of the solenoid 51 is stopped, the shut-off valve is closed by virtue of the action of the spring 56.

Returning to FIG. 3, a gap 59 is provided between the solenoid holder 52 and the rod 53 so that the rod 53 can move relative to the solenoid holder 52. If this gap 59 is too large, the rod 53 is allowed to swing in radial directions, and therefore, the gap 59 must be kept as small as possible. If natural gas is dried imperfectly, it eventually contains water, or, as shown in FIG. 4A, when compressed natural gas is filled in the CNG tank 12, there is a risk of water contained in nearby air entering into the CNG tank 12.

With the water present:, the water may penetrate into the gap 59 and produce foreign matters thereat, slowing the movement of the rod 53.

To cope with this, the present invention provides a technology that can cope with the slowed movement of the shut-off valve 50 resulting from a reason as described above. The technology will be described later.

Figure 5:
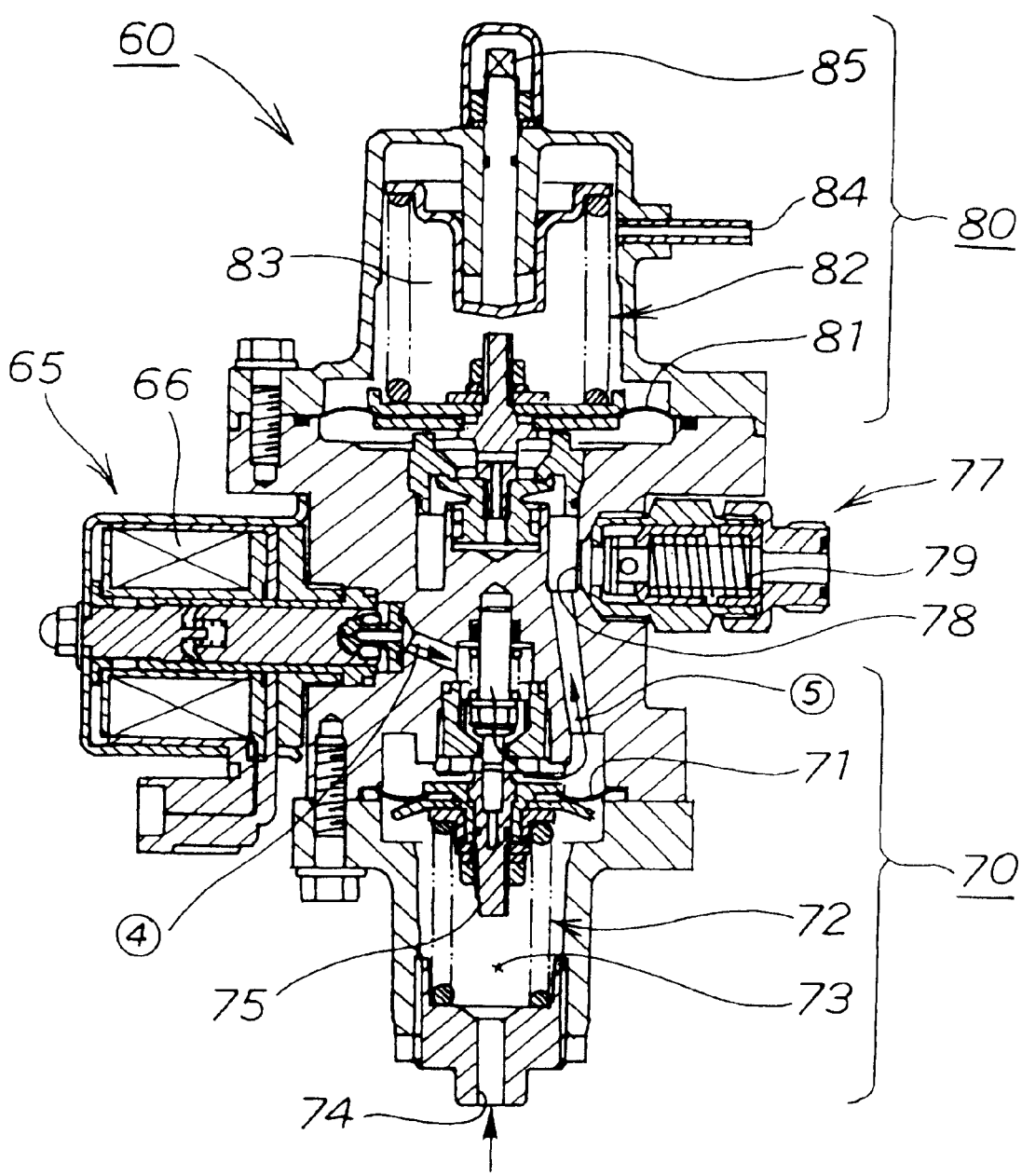
FIG. 5 is an enlarged view of a part indicated by a reference numeral V in FIG. 2.

FIG. 5 is an enlarged sectional view of a portion indicated by a circle denoted by reference numeral V in FIG. 2. An operation thereof will be described later referring to FIG. 7, and therefore, the construction thereof will briefly be described here.

The pressure control unit 60 is an integrated body comprising the second shut-off valve 65, a primary pressure reducing valve 70, a safety valve 77 and a secondary pressure reducing valve 80. Although a detailed description of the construction thereof will be omitted, the second shut-off valve 65 is a solenoid controlled shut-off valve using a solenoid 66 as a driving source, and the primary pressure reducing valve 70 is a pressure regulator comprising a diaphragm 71, pressure regulating spring 72, a back pressure chamber 73, a back pressure inlet port 74 and a pressure regulating screw 75. The safety valve 77 is a valve comprising a valve element 78 and a spring 79, and the secondary pressure reducing valve 80 is a pressure regulator comprising a diaphragm 81, a pressure regulating spring 82, a back pressure chamber 83, a back pressure inlet port 84 and a pressure regulating screw 85.

Figure 6:
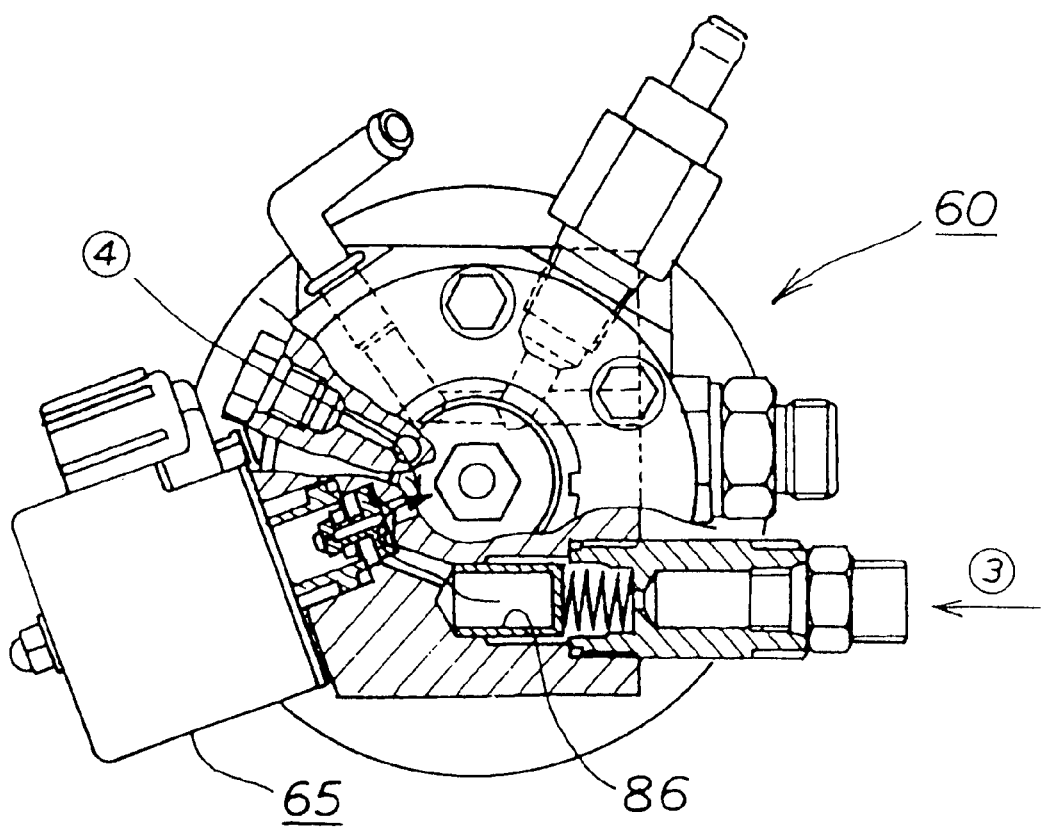
FIG. 6 is a bottom view of a pressure control unit shown in FIG. 5.

FIG. 6 is a bottom view of the pressure control unit shown in FIG. 5. The compressed natural gas entering into the pressure control unit 60 as indicated by an arrow ③ flows as indicated by an arrow ④ via an inner filter 86 and the second shut-off valve 65. Returning to FIG. 5, the flow indicated by the arrow ④ passes through the primary pressure reducing valve 70, flows upwardly as indicated by an arrow ⑤ and reaches the secondary pressure reducing valve 80.

Figure 7:
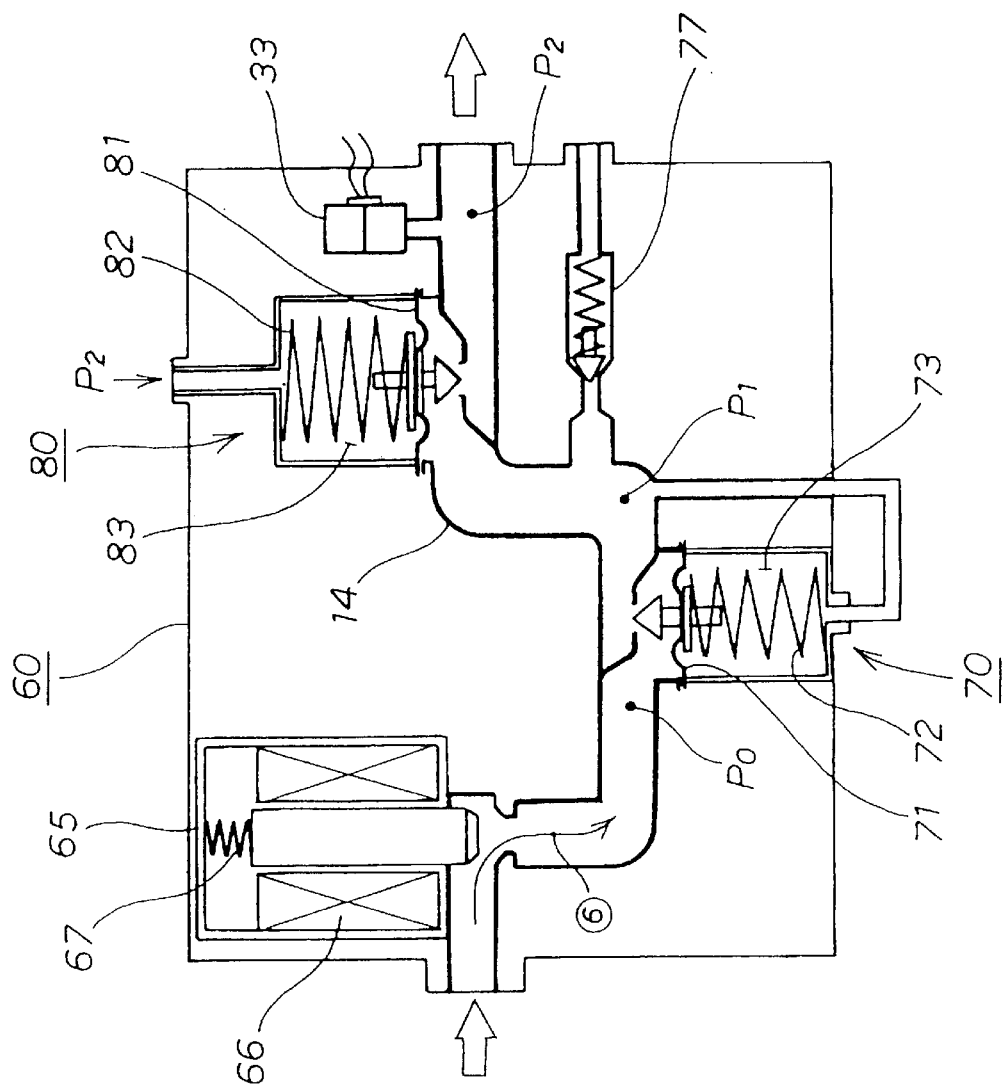
FIG. 7 is a drawing showing the operational principle of the pressure control unit adopted in the present invention.

FIG. 7 is a diagram showing the operational principle of the pressure control unit adopted in the present invention. The primary pressure reducing valve 70 is intended to reduce the pressure $P_0$ to the pressure $P_1$. To be specific, the pressure $P_0$ acts on an upper surface of the diaphragm 71 as viewed in the drawing, and the pressure $P_1$ and a pushing force of the spring 72 act on a lower surface of the diaphragm 71 as viewed in the drawing. When the opening degree of the valve is determined by a balance of three forces acting on the diaphragm, the natural gas is allowed to flow. If the pressure $P_1$ is increased higher than a set pressure therefor, the pressure inside the back pressure chamber 73 is increased to thereby push up the diaphragm 71, whereby the valve is throttled. As a result of this, the pressure P1 is reduced. In the event that the pressure $P_1$ is lower than the set pressure, on the contrary, the opening degree of the valve is increased, and the pressure P1 is increased. Thus, the primary pressure reducing valve 70 can maintain the pressure $P_1$ at the predetermined set pressure.

In this embodiment, the pressure $P_0$ ranges 10 to 260 kg/cm$^2$, and the pressure $P_1$ is 6 kg/cm$^2$. Even if the pressure $P_0$ is remarkably changed, the pressure $P_1$ can be maintained so as to provide a constant pressure.

The secondary pressure reducing valve 80 is intended to reduce the pressure $P_1$ to the pressure $P_2$, and a basic operation thereof is the same as that of the primary pressure reducing valve 70, and therefore, a description thereof will be omitted. The pressure $P_1$ is 6 kg/cm$^2$ and the pressure $P_2$ is 2.6 kg/cm$^2$. It is needless to say that the pressure $P_2$ can be maintained at the predetermined set pressure even if the pressure $P_1$ fluctuates. The pressure $P_2$ is detected by the second pressure sensor 33.

The pressure values described above are illustrated as examples only, and the present invention is not limited to those numerical values.

When the solenoid 66 is excited, the second shut-off valve 65 is opened so as to allow the natural gas to flow as indicated by an arrow ⑥, and when the excitation of the solenoid 66 is stopped, the shut-off valve is closed by virtue of the action of the spring 67.

The safety valve 77 is provided so as to cope with a remarkable increase in the pressure P1 that would be caused by a trouble taking place in the primary pressure reducing valve 70 and is constructed so as to be opened when such a remarkable increase actually occurs to: thereby protect the low pressure piping 14 including the secondary pressure reducing valve 80.

Next, described below will be a technology for judging of a failure of the shut-off valves used in the aforesaid fuel gas supply system according to the present invention.

Figure 8:
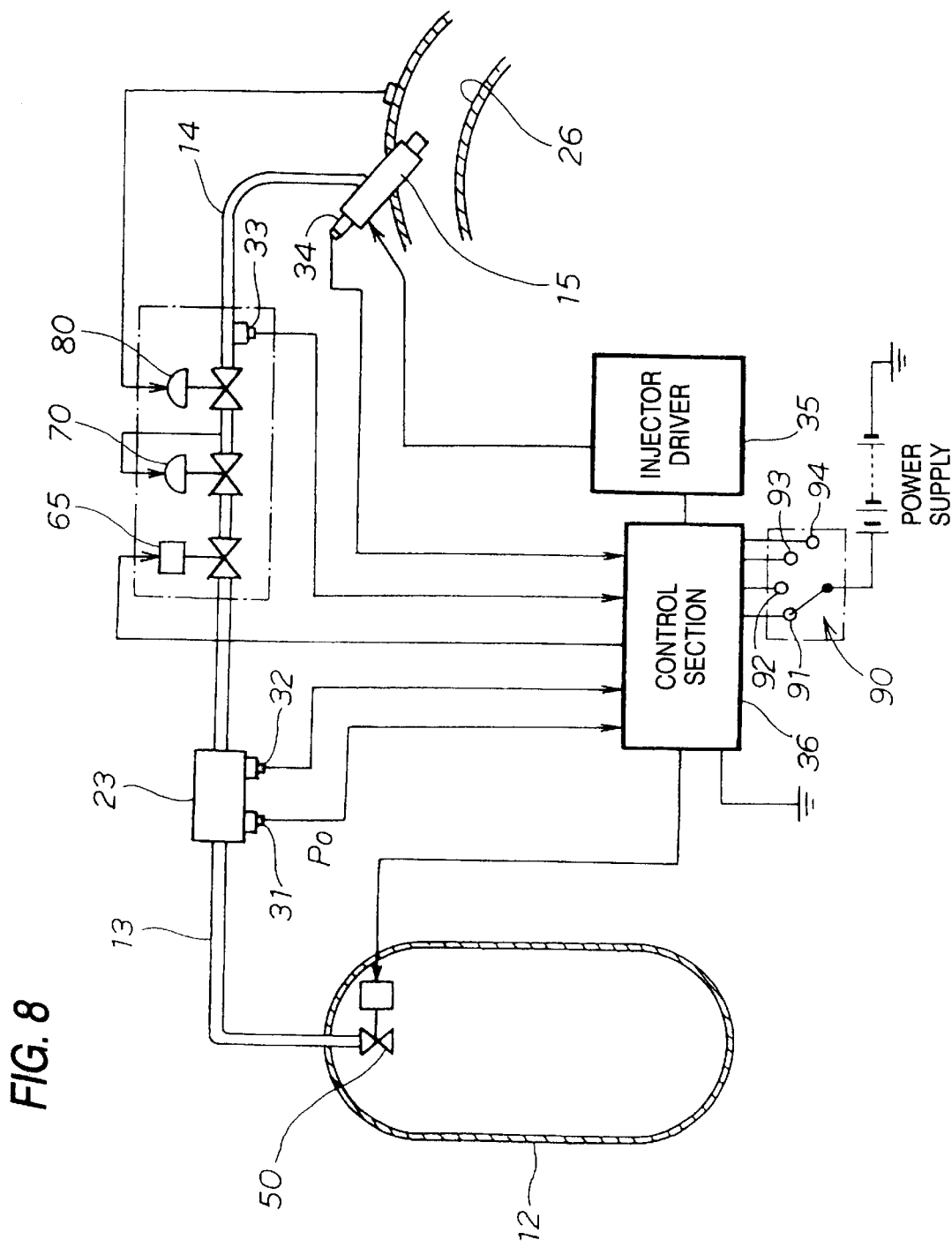
FIG. 8 is a fuel gas supply system drawing for use in explaining a failure judgement technology according to the present invention.

FIG. 8 is a fuel gas supply system drawing for use in explaining a failure judgement technology according to the present invention and is a combination of the main part extracted from FIG. 2 and a starter switch 90 additionally shown therein in order to suffice a control flow that will be described below. The starter switch 90 comprises ACC-OFF contact 91, ACC-ON contact 92, IG-ON contact 93 and ST-ON contact 94. With ACC-OFF contact 91 being selected, an accessory OFF state is produced, with ACC-ON contact 92 selected, an accessory ON state is produced, with IG-ON contact 93 selected, an ignition ON state is produced, and with ST-ON contact 94 selected, the rotation of a starter is initiated.

The other reference numerals have been described and therefore they will not be described here in order to avoid a repeated description thereof. However, as described referring to FIG. 3, there is a possibility that there is caused a trouble with the first shut-off valve 50 in which the shut-off valve is left "opened" and cannot be closed due to rust generated by water contained in methane gas or entering thereinto during the production process. A means for judging of the trouble will be described below.

Figure 9:
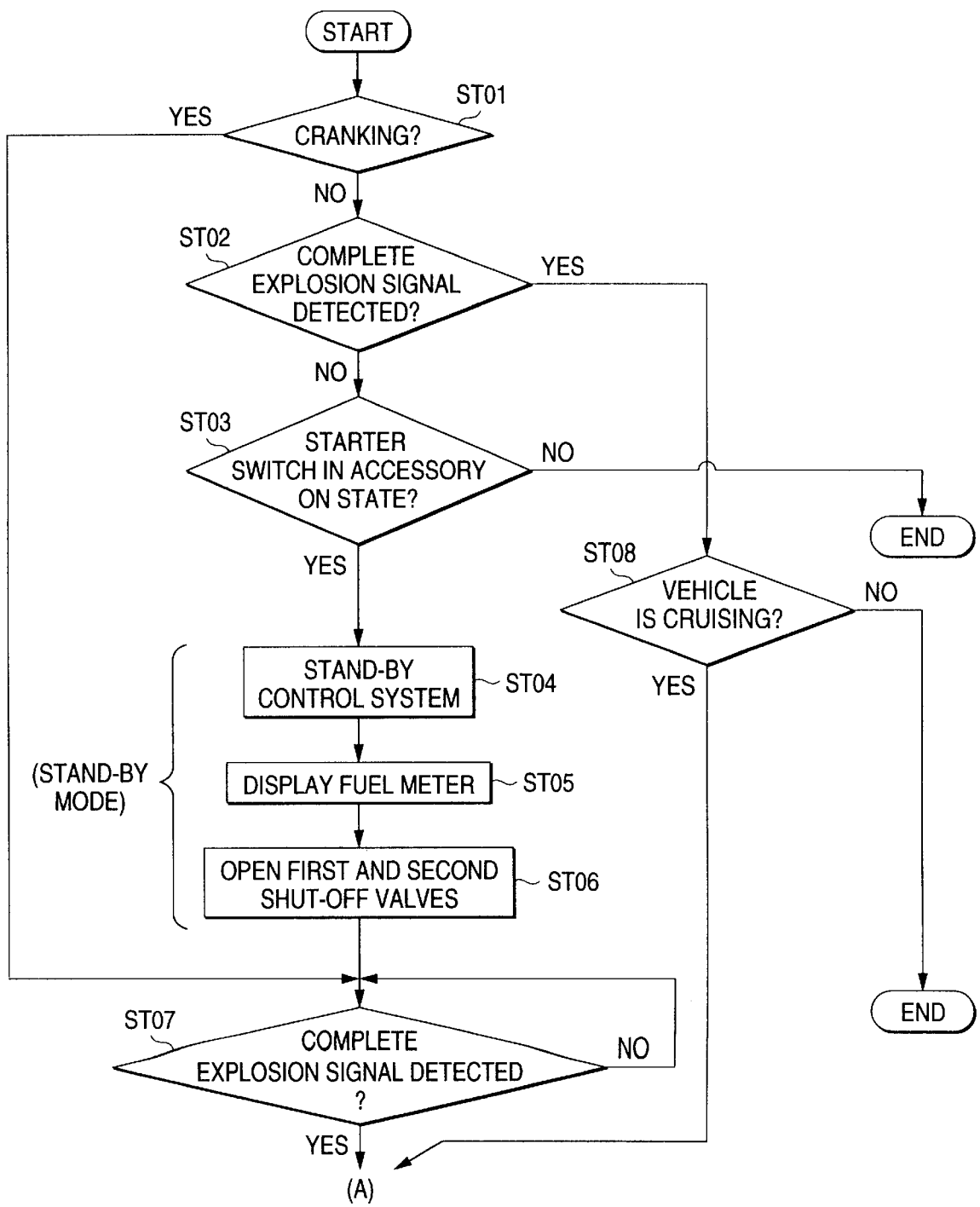
FIG. 9 is a flowchart for detecting a failure of the first shut-off valve according to the present invention (part 1)

FIG. 9 is a flowchart (part 1) for detecting a failure of the first shut-off valve, and in the flowchart, STXX denotes a step number.

ST01: first, it is judged whether or not the engine is in a cranking state, that is, whether or not the crank shaft of the engine is in a rotating state occurring before a complete explosion is caused to take place in the cylinders by an engine starter. To be specific, the number of rotations of the crank shaft is measured by a crank shaft rotation sensor (not shown), and in the event that the number of rotations so measured falls within a range which is greater than zero (0) and is smaller than 500 rpm (rotations/minute), then the answer is YES, and the flowchart jumps to ST07.

ST02: If NO in ST01, a complete explosion signal or a signal indicating whether or not a complete cylinder combustion is occurring is investigated. Specifically, the complete explosion signal is judged as YES if the number of rotations of the crank shaft exceeds a predetermined number of rotations (for instance, 500 rpm).

ST03: If the complete explosion signal indicates NO in ST02, this means that the engine has not yet been started, and therefore, whether or not the engine starter switch is positioned in the accessory ON state is checked. If No, in other words, if the starter switch is not in the accessory ON state, this means that the engine is not in a started state, and therefore the flowchart ends, and no further failure diagnosis is carried out.

ST04: In the event that the starter switch is confirmed to be in the accessory ON state in ST03, the control system is put in a stand-by state. To be specific, in FIG. 8, power is supplied to the control section 36 and the injector driver 35 from the power supply so as to activate the first and second pressure sensors 31, 33 and the first and second temperature sensors 32, 34, and a diagnostic timer, not shown, is started.

ST05: A fuel meter is put in a display state,

ST06: The solenoids of the first shut-off valve 50 and the second shut-off valve 65 shown in FIG. 8 are excited so as to open the valves. This produces a state in which a fuel gas can be supplied from the compressed gas cylinder to the engine.

ST07: Check whether or not a complete explosion signal has been detected. If NO, wait until the signal can be detected. If YES, advance to (A).

ST08: If the complete explosion signal is detected in ST02 and the vehicle is cruising, the answer is YES, and then jump directly to (A) bypassing ST02 to ST07.

Figure 10:
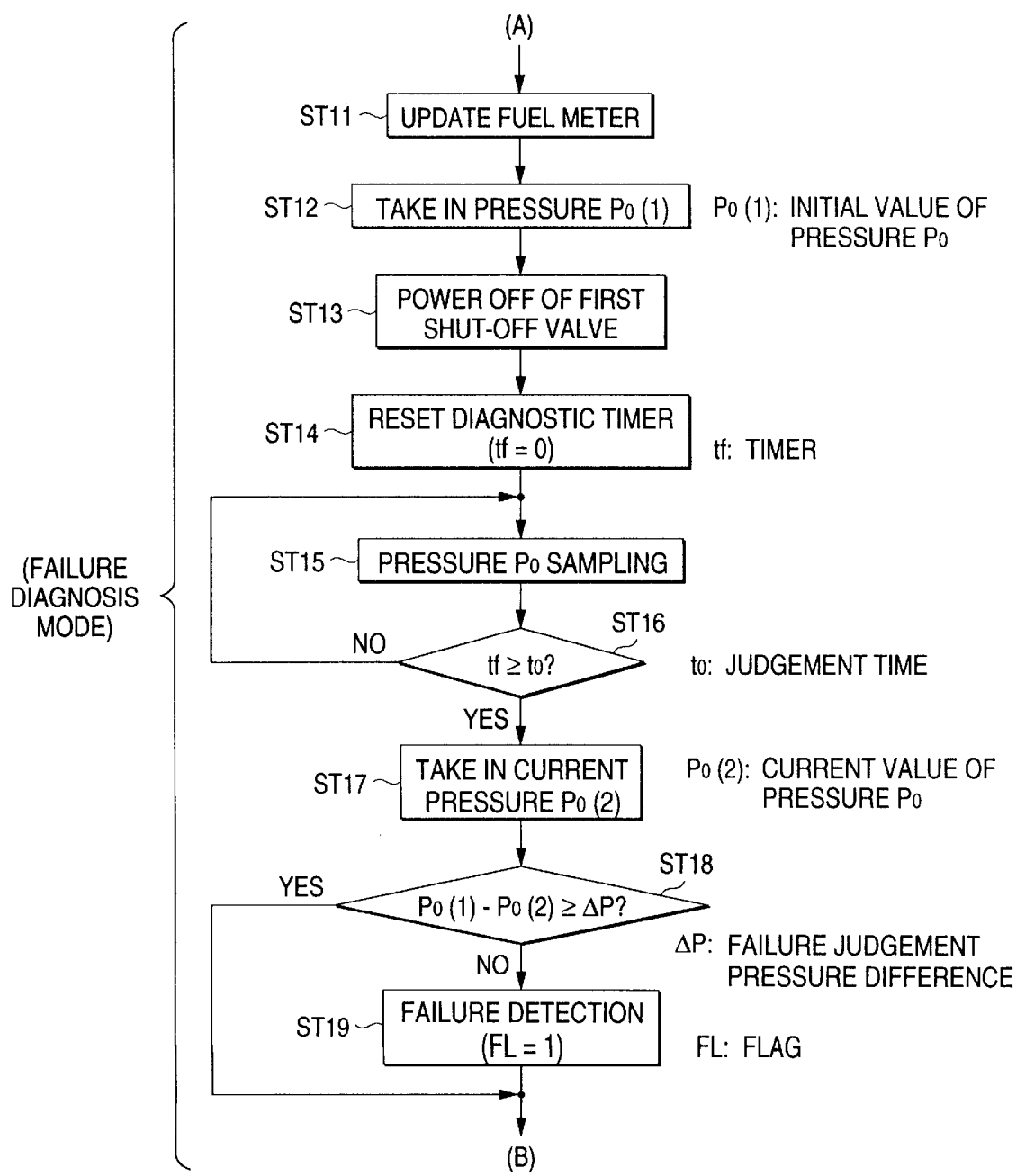
FIG. 10 is a flowchart for detecting a failure of the first shut-off valve according to the present invention (part 2)

FIG. 10 is a flowchart (part 2) for detecting a failure of the first shut-off valve according to the present invention, which follows (A) in the previous flowchart. As a matter of convenience, the step number starts from ST11.

ST11: Here, the fuel meter is updated before a failure diagnosis is carried out. This is because the display of the meter is not updated when the valve is judged as being in a failure state while the meter display is updated when the valve is judged as not being in a failure state.

ST12: Pressure information is taken in from the first pressure sensor and stored. This pressure information is an initial value of the pressure $P_0$ and is called a pressure $P_0(1)$.

ST13: The excitation of the solenoid of the first shut-off valve is stopped so as to close the same. The second shut-off valve is left opened (refer to ST06).

ST14: The diagnostic timer is reset so as to make tf=0.

ST15: The pressure $P_0$ then is sampled by taking in pressure information from the first pressure sensor.

ST16: The sampling of the pressure $P_0$ is continued until the integrated time tf of the diagnostic timer equals to or exceeds a predetermined judging time $t_0$(an elapsed time required for judgement). Every time the sampling is repeated, the pressure P0 becomes a new value. If tf≧$t_0$ is satisfied, then advance forward. How to determine the judging time $t_0$ will be described later on.

ST17: The pressure $P_0$ is taken in, and the pressure so taken in is regarded as a new value, this being called a pressure $P_0(2)$.

ST18: If $P_0(1)-P_0(2)$ equals to or greater than a predetermined pressure difference ΔP, then advance directly to (B), and on the contrary, if it is smaller than ΔP, then advance to ST19.

ST19: Impart 1 to flag FL as a failure detection identification.

ST11 to ST19 described above is a failure diagnosis mode, and a diagnosis operation will be described in detail referring to FIG. 12.

Figure 11:
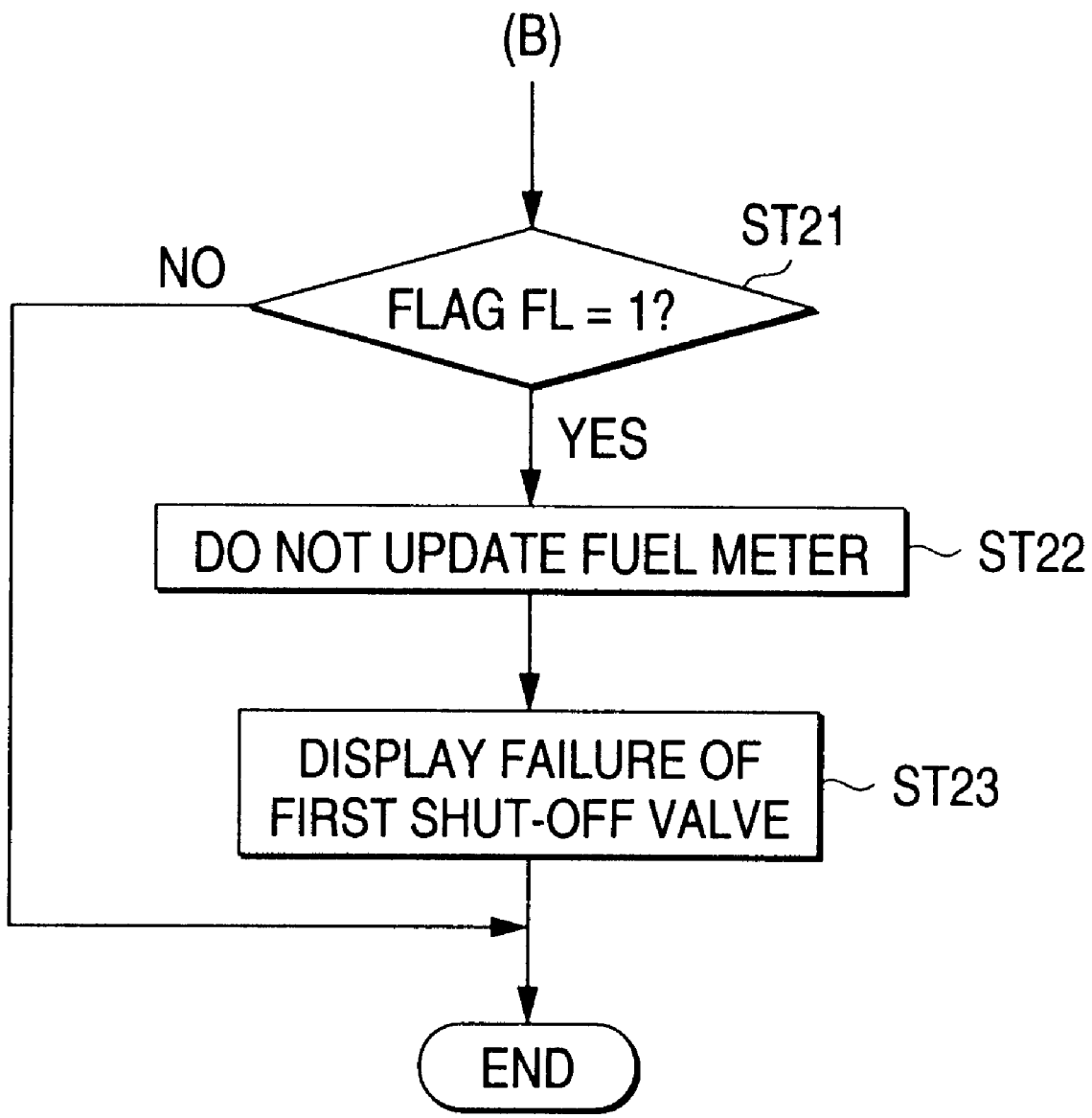
FIG. 11 is a flowchart for detecting a failure of the first shut-off valve according to the present invention (part 3)

FIG. 11 is a flowchart (part 3) for detecting a failure of the first shut-off valve according to the present invention. The flowchart should follow (B) in the previous flowchart, but as a matter of convenience, the step number starts from ST21.

ST21: Check whether or not the flag indicates "1" which designates a failure, and if it does not so indicate, then advance directly to END, and on the contrary, if it does, move to the following step.

ST22: Since the valve is judged as in a failure state, the fuel meter is not updated. This is because the meter display is updated when the valve is judged as not being in a failure state, while the display of the meter is not updated when the valve is judged as being in a failure state.

ST23: A failure of the first shut-off valve is displayed in a warning display section (announcement panel or instrument panel) by means of a lamp or the like.

When the warning is displayed, the driver drives the vehicle to a garage for repair to eliminate the failure so warned of without any delay.

In the above embodiment, the pressure sensor information is directly read in for failure diagnosis, but a pressure value may be used for failure diagnosis that is corrected based on a reference value by respective pressure sensor information and temperature sensor information.

FIG. 12 is a time chart showing a failure diagnosis of the shut-off valves according to the present invention.

In (a) of FIG. 12, assume that a failure diagnostic signal is inputted. It is desirable that this signal is generated in the control section in step (A) in FIG. 10.

This input of the signal initiates the failure diagnosis mode, and as shown in (b) of FIG. 12, after the diagnostic timer is reset, the counting is started (refer to the aforesaid ST14), and simultaneously with this, as shown in (d) of FIG. 12, the first shut-off valve is switched from "open" to "close" (refer to the aforesaid ST13). As shown in (c) of FIG. 12, the second shut-off valve is left opened.

In FIG. 8, when the first shut-off valve 50 is closed with the second shut-off valve being left opened while the engine is running, since the supply of the compressed natural gas from the CNG tank 12 to the high pressure piping 13 is stopped, only the compressed natural gas remaining in the high pressure piping 13 and the low pressure piping 14 is allowed to flow to the intake port 26, and as a result of this, it is supposed that the pressure inside the high pressure piping 13 is greatly reduced.

However, when the first shut-off valve 50 fails so as not to be closed, being left opened, the CNG tank 12 continues to supply the compressed natural gas to the high pressure piping 13, and therefore, the pressure inside the high pressure piping 13 is not reduced or reduced slowly. This will be explained by referring to a graph shown.

As shown in (e) of FIG. 12, assuming that time is expressed by the axis of abscissas and pressure by the axis of ordinates, in a normal state, as shown in a thick solid line, the pressure $P_0(2)$ is greatly reduced after an elapse of time $t_0$. On the other hand, with the first shut-off valve being not completely closed, as shown in a broken line, there is caused only a slight pressure drop.

Then, experiments are repeatedly carried out on the degree of pressure drop using an actual engine and a fuel gas supply system, so that ΔP as a threshold value and time $t_0$ required for a diagnosis are determined, and those so determined are then stored. This procedure is substantially identical to a procedure in which a "pressure drop rate threshold value" is determined from the ΔP and time $t_0$ for storage in the control section.

A diagnosis is carried out using this pressure drop rate threshold value as a reference. To be concrete, it is determined that if the pressure drop amount after the elapse of time to is equal to or greater than ΔP, it is to be regarded as normal, while it is smaller than ΔP, then it is to be regarded as a failure.

FIG. 13 is a time chart showing a diagnosis of the shut-off valves according to another embodiment of the present invention.

(a), (c) and (d) of FIG. 13 are identical to those described in FIG. 12, and therefore a description thereof will be omitted here.

In (b) of FIG. 13, time $t_0$, is obtained that is required until the initial pressure $P_0(1)$ is reduced by ΔP.

In (e) of FIG. 13, pressure is expressed by the axis of abscissas and time by the axis of ordinates, and a thick solid line indicates that the time is short that is required until the pressure is reduced by ΔP. Since the short time indicates a drastic pressure drop, it is regarded as normal. On the contrary, as shown in a broken line, if a long time is required until the pressure is reduced by ΔP, this means that the pressure drop is slow, and therefore it is regarded as a failure. Consequently, time $t_1$ and a certain ΔP are predetermined as a threshold value and stored in the control section. This procedure is substantially identical to a procedure in which a "pressure drop rate threshold value" is determined from the ΔP and time $t_1$ for storage in the control section.

A diagnosis is carried out using this pressure drop rate threshold value as a reference.

A control flowchart corresponding to (a) to (e) of FIG. 13 will be omitted.

In FIG. 12, the pressure drop is investigated with the time being predetermined, while in FIG. 13, the time is investigated with the pressure being predetermined. In either way, the "pressure drop rate" can be obtained which corresponds to what is obtained by dividing the pressure drop amount by the time.

The first shut-off valve 50 shown in FIG. 8 is opened and/or closed based on a command from the control section 36. Therefore, if the present invention is applied to that construction, the first shut-off valve 50 is closed by a command from the control section 36 so as to exhibit a shut-off function, whereby it is possible to judge whether or not the shut-off valve is in a failure state while the vehicle is being stopped or driven.

In addition, in the embodiments of the present invention, since no diagnosis is designed to be carried out when the vehicle is not cruising, it is possible to avoid a diagnosis in an unstable condition, whereby the reduction in reliability in judgement can be prevented.

The shut-off valve and the pressure sensor may be the second shut-off valve and the second pressure sensor. In other words, since the present invention is constructed so as to function through a combination of a shut-off valve and a pressure sensor disposed downstream (or on the secondary side) thereof, it is possible to diagnose the first shut-off valve and the second shut-off valve in an alternate fashion. However, it is necessary that pressure drop threshold values are set separately for the respective valves.

In addition, as described in the embodiments, the present invention becomes more advantageous when it is applied to the first shut-off valve closer to the CNG tank. This is because since the first shut-off valve is disposed closer to the CNG tank than the second shut-off valve, the first shut-off valve is considered to be more badly affected by water penetrating into the CNG tank than the second shut-off valve.

Furthermore, the fuel gas may be of any kind of fuel gas including compressed natural gas, hydrogen gas and coal gas, and therefore there is no limitation to the kind thereof.

Constructed as described above, the present invention exhibits the following advantages.

According to the invention, the shut-off valve used in the fuel gas supply system can be diagnosed with respect to a failure in which the shut-off valve is left open and cannot be closed while the vehicle is being stopped or driven. From this diagnosis, it is possible to further diagnose that the shut-off valve operates properly at suitable timings, whereby a trouble can be prevented that is entailed by a failure of the shut-off valve.

While only certain embodiments of the invention have been specifically described herein, it will apparent that numerous modification may be made thereto without departing from the spirit and scope of the invention.

The present disclosure relates to the subject matter contained in Japanese patent application No. Hei. 11-76257 field on Mar. 19, 1999 which is expressly incorporated herein by reference in its entirety.

What is claimed is:

1. A vehicle fuel gas supply system, comprising:
   a piping supplying a fuel gas to a gas engine;
   a shut-off valve and a pressure sensor disposed on said piping, said pressure sensor being disposed closer to said gas engine in comparison with said shut-off valve; and
   a control section calculating a pressure drop rate based on pressure information taken in from said pressure sensor and an elapsed time after the closure of said shut-off valve, and judging that said shut-off valve is in a failure state when said pressure drop rate so calculated is smaller than a predetermined pressure drop rate threshold value.

2. A vehicle fuel gas supply system according to claim 1, wherein said control section generates a failure diagnostic signal for closing said shut-off valve.

3. A vehicle fuel gas supply system according to claim 1, wherein said pressure drop rate threshold value is determined based on a predetermined pressure difference and a predetermined time.

4. A vehicle fuel gas supply system according to claim 3, wherein said elapsed time is determined equal to said predetermined time.

5. A vehicle fuel gas supply system according to claim 1, wherein said shut-off valve is at least partially disposed in a tank filled with the fuel gas.

6. A vehicle fuel gas supply system according to claim 1, wherein, when said shut-off valve is in the failure state, a fuel meter stops the update of a meter display.

7. A failure-state determination apparatus for determining whether a shut-off valve in a vehicle fuel gas supply system operates normally or fails, the failure-state determination apparatus comprising:
   a piping supplying a fuel gas to a gas engine;
   a pressure sensor disposed on said piping, said pressure sensor being disposed closer to said gas engine in comparison with said shut-off valve; and a control section calculating a pressure drop rate based on pressure information taken in from said pressure sensor and an elapsed time after the closure of said shut-off valve, and determining that said shut-off valve is in either a failure state when said pressure drop rate so calculated is smaller than a predetermined pressure drop rate threshold value or a normal operative state when said calculated pressure drop rate is at least equal to or greater than the predetermined pressure drop rate threshold value.

* * * * *